United States Patent
Chen et al.

(10) Patent No.: US 12,184,313 B2
(45) Date of Patent: Dec. 31, 2024

(54) ANTENNA SWITCHING CIRCUIT AND ELECTRONIC DEVICE

(71) Applicant: Huawei Technologies Co., Ltd., Shenzhen (CN)

(72) Inventors: Zhijun Chen, Shanghai (CN); Fei Huang, Shanghai (CN); Weitao Jing, Shanghai (CN); Weichen Huang, Shanghai (CN); Liping Yang, Shenzhen (CN); Linghua Yuan, Shanghai (CN); Xingcan Zhao, Shanghai (CN); Hui Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 447 days.

(21) Appl. No.: 17/622,515

(22) PCT Filed: Jun. 28, 2020

(86) PCT No.: PCT/CN2020/098399
§ 371 (c)(1),
(2) Date: Dec. 23, 2021

(87) PCT Pub. No.: WO2020/259665
PCT Pub. Date: Dec. 30, 2020

(65) Prior Publication Data
US 2022/0255569 A1    Aug. 11, 2022

(30) Foreign Application Priority Data
Jun. 28, 2019   (CN) .......................... 201910573283.1

(51) Int. Cl.
*H04B 1/00* (2006.01)
*H04B 1/04* (2006.01)
(Continued)

(52) U.S. Cl.
CPC ......... *H04B 1/0067* (2013.01); *H04B 1/0483* (2013.01); *H04B 1/40* (2013.01); *H04B 7/0602* (2013.01)

(58) Field of Classification Search
CPC ...... H04B 1/0067; H04B 1/0483; H04B 1/40; H04B 7/0602; H04B 1/0053; H04B 1/0458
(Continued)

(56) References Cited

U.S. PATENT DOCUMENTS 6,115,585 A     9/2000  Matero et al.
2006/0293005 A1  12/2006  Hara et al.
(Continued)

FOREIGN PATENT DOCUMENTS

CN    101167256 A      4/2008
CN    206117665 U   *  4/2017
(Continued)

*Primary Examiner* — Tanmay K Shah
(74) *Attorney, Agent, or Firm* — Conley Rose, P.C.

(57) ABSTRACT

An antenna switching circuit, electronic device and method. The switching circuit includes a radio frequency processor, a radio frequency front-end, a first switch, and an antenna system with a plurality of antennas. The radio frequency processor receives a first radio frequency signal, generates a second radio frequency signal based on a loss value of the first switch, and transmits the second radio frequency signal to the first switch. The first switch selects, from a plurality of radio frequency channels in the radio frequency front-end, a radio frequency channel coupled with the radio frequency processor, and transmits the second radio frequency signal to a radio frequency channel. The radio frequency front-end receives and processes the second radio frequency signal to generate a third radio frequency signal and transmits it to the antenna system, which outputs the third radio frequency signal.

20 Claims, 6 Drawing Sheets

(51) Int. Cl.
*H04B 1/40* (2015.01)
*H04B 7/06* (2006.01)

(58) Field of Classification Search
USPC ........................................................ 455/552.1
See application file for complete search history.

(56) References Cited

U.S. PATENT DOCUMENTS

| 2019/0123769 A1 | 4/2019 | Pehlke et al. |
| 2021/0143844 A1 | 5/2021 | Yang |
| 2021/0288676 A1 | 9/2021 | Zhang |
| 2021/0351812 A1 | 11/2021 | Chen et al. |

FOREIGN PATENT DOCUMENTS

| CN | 108736903 A | 11/2018 | |
| CN | 108768434 A | 11/2018 | |
| CN | 108988877 A | 12/2018 | |
| CN | 109274397 A | 1/2019 | |
| CN | 109802699 A * | 5/2019 | ............ H04B 1/006 |
| CN | 109873245 A | 6/2019 | |
| CN | 109889216 A | 6/2019 | |
| JP | 2010161711 A | 7/2010 | |
| WO | 2019055142 A1 | 3/2019 | |

* cited by examiner

ANTENNA SWITCHING CIRCUIT AND ELECTRONIC DEVICE

CROSS-REFERENCE TO RELATED APPLICATIONS

This is a U.S. National Stage of International Patent Application No. PCT/CN2020/098399 filed on Jun. 28, 2020, which claims priority to Chinese Patent Application No. 201910573283.1 filed on Jun. 28, 2019. Both of the aforementioned applications are hereby incorporated by reference in their entireties.

TECHNICAL FIELD

This application relates to wireless communications technologies, and in particular, to an antenna switching circuit and an electronic device.

BACKGROUND

A 5G network architecture has two types: standalone (standalone. SA) and standalone (non-standalone, NSA) combined with a 4G network. SA refers to a new 5G network, including a new base station, backhaul link, and core network. In addition to introducing brand new network elements and interfaces, SA further uses new technologies such as network virtualization and software-defined networking on a large scale, and combines the new technologies with 5G new radio (New Radio. NR). In addition, protocol development, network planning and deployment, and interworking and interoperation of SA face more technical challenges than those of 3G and 4G systems. NSA refers to deployment of a 5G network using existing 4G infrastructure. A 5G carrier based on an NSA architecture carries only user data, and control signaling of the 5G carrier is still transmitted over a 4G network. An operator may determine to upgrade a site and an area based on a service requirement, and does not necessarily need complete and contiguous coverage. Compared with SA, NSA has the following advantages: (1) expansion of 5G coverage with the help of the current mature 4G network; (2) earlier finished NSA standards and more mature products; and (3) no need for a new core network.

For a sub-6 GHz (sub-6 GHz) frequency band (for example, 3.5 GHz or 5 GHz) in a 5G network, there is great spatial fading in a transmission process, and an electronic device is easily limited in uplink during use, especially in contact with a human's head and hands and in other scenarios involving a human body. However, switching a transmit antenna to an area that is not held by a human body can effectively improve performance of the electronic device, and is therefore an effective method for improving user experience. In addition, when the electronic device sends a sounding reference signal (Sounding Reference Signal, SRS) in uplink and downlink, the electronic device is required to be capable of switching a plurality of antennas to operate, to send the SRS in turn.

Due to factors such as costs and power consumption, it is a common practice that a transceiver (transceiver) module of a terminal does not use a design of more than two transmit channels. However, in an NSA scenario, a 4G signal needs to occupy one transmit channel, and only one transmit channel is left for a 5G signal. In this case, a design of a one transmit two receive (One Transmit Two Receive, 1T2R) antenna mode is commonly used. If a switch is added to a subsequent stage of a power amplifier (Power Amplifier. PA) to implement switching in a one transmit four receive (One Transmit Four Receive, 1T4R) antenna mode, the existing technology increases a front-end loss of a radio frequency channel and complexity of a board-level design.

SUMMARY

This application provides an antenna switching circuit and an electronic device.

According to a first aspect, an antenna switching circuit is provided, including; a radio frequency processing module, a radio frequency front-end module, a first switching module, and an antenna module. The radio frequency processing module receives a first radio frequency signal from an external circuit, processes the first radio frequency signal based on a loss value of the first switching module to generate a second radio frequency signal, and transmits the second radio frequency signal to the first switching module. The first switching module is configured to select, from a plurality of radio frequency channels in the radio frequency processing module, a radio frequency channel electrically connected to the radio frequency processing module, and transmit the second radio frequency signal to one of the plurality of radio frequency channels. The radio frequency front-end module receives the second radio frequency signal transmitted by the first switching module, processes the second radio frequency signal to generate a third radio frequency signal, and transmits the third radio frequency signal to the antenna module. The antenna module includes a plurality of antennas, and the antenna module receives the third radio frequency signal transmitted by the radio frequency front-end module, and sends out the third radio frequency signal.

According to the switching circuit in this embodiment of this application, the radio frequency processing module may take into account a loss of the second radio frequency signal passing through the first switching module, increase an amplification multiple of a power amplifier in the radio frequency processing module, and increase power of the second radio frequency signal, to implement multi-channel switching of the radio frequency channel and multi-channel switching of the antenna while ensuring that transmit power of the antenna is roughly unchanged, so that an SRS can be sent in turn.

With reference to the first aspect, in some implementations of the first aspect, the radio frequency processing module includes a first transmit channel and a second transmit channel, and at least one of the first transmit channel and the second transmit channel operates on a 5G frequency band.

According to the switching circuit in this embodiment of this application, the antenna switching circuit may be applied to an NSA scenario, and when the radio frequency processing module has only one transmit channel applied to the 5G frequency band, switching of the plurality of antennas and the radio frequency channel is implemented.

With reference to the first aspect, in some implementations of the first aspect, the switching circuit further includes: a second switching module, configured to select an antenna electrically connected to a radio frequency channel in the radio frequency front-end module, and the second switching module receives the third radio frequency signal transmitted by the radio frequency front-end module, and transmits the third radio frequency signal to the antenna module.

According to the switching circuit in this embodiment of this application, two-stage switching of the circuit can be implemented, and multi-channel switching of the radio frequency channel and multi-channel switching of the antenna can be implemented by the two-stage switching, so that an SRS can be sent in turn.

With reference to the first aspect, in some implementations of the first aspect, the antenna module includes a first antenna, a second antenna, a third antenna, and a fourth antenna, the first antenna and the second antenna are a first group, the third antenna and the fourth antenna are a second group, and the first switching module selects an antenna in the first group or the second group to send out the third radio frequency signal.

With reference to the first aspect, in some implementations of the first aspect, the second switching module selects the first antenna or the second antenna in the first group to send out the third radio frequency signal, or the third antenna or the fourth antenna in the second group to send out the third radio frequency signal.

According to the switching circuit in this embodiment of this application, two-stage switching of the antenna can be implemented by using the first switching module and the second switching module, and switching of the plurality of antennas can be implemented while ensuring that transmit power of the antenna is roughly unchanged.

With reference to the first aspect, in some implementations of the first aspect, the second switching module determines, based on strength of a signal received by the antenna module, an operating antenna in the first group or the second group, and the first switching module determines, based on the strength of the signal received by the antenna module, that the third radio frequency signal is to be sent out by the antenna in the first group or the second group.

According to the switching circuit in this embodiment of this application, switching of the antenna and a radio frequency circuit can be performed based on related information of the signal received by the antenna, thereby improving communication stability and improving user experience.

With reference to the first aspect, in some implementations of the first aspect, the first switching module includes at least one double-pole double-throw switch, and the second switching module includes at least one double-pole double-throw switch.

According to the switching circuit in this embodiment of this application, switching of two radio frequency channel and switching of four antennas can be implemented by using the double-pole double-throw switches as the first switching module and the second switching module, so that costs are relatively low.

With reference to the first aspect, in some implementations of the first aspect, the plurality of radio frequency channels each include a power amplifier and a filter, to perform power amplification and filtering on the second radio frequency signal.

With reference to the first aspect, in some implementations of the first aspect, the first switching module and the radio frequency processing module are integrated in a radio frequency chip.

According to the switching circuit in this embodiment of this application, the first switching module may be integrated in a radio frequency chip, or the radio frequency processing module and the first switching module may be integrated in the same radio frequency chip.

According to a second aspect, an electronic device is provided, including an application processor, a baseband module, a radio frequency processing module, a radio frequency front-end module, a first switching module, and an antenna module. The application processor is configured to generate a first signal, and transmit the first signal to the baseband module. The baseband module is configured to process the first signal to generate a second signal, and transmit the second signal to the radio frequency processing module. The radio frequency processing module receives the second signal, processes the second signal based on a loss value of the first switching module to generate a third signal, and transmits the third signal to the first switching module. The first switching module is configured to select, from a plurality of radio frequency channels in the radio frequency processing module, a radio frequency channel electrically connected to the radio frequency processing module, and transmit the third signal to one of the plurality of radio frequency channels. The radio frequency front-end module receives the third signal transmitted by the first switching module, processes the third signal to generate a fourth signal, and transmits the fourth signal to the antenna module. The antenna module includes a plurality of antennas, and the antenna module receives the fourth signal transmitted by the radio frequency front-end module, and sends out the fourth signal.

With reference to the second aspect, in some implementations of the second aspect, the radio frequency processing module includes a first transmit channel and a second transmit channel, and at least one of the first transmit channel and the second transmit channel operates on a 5G frequency band.

With reference to the second aspect, in some implementations of the second aspect, the switching circuit further includes: a second switching module, configured to select an antenna electrically connected to a radio frequency channel in the radio frequency front-end module, and the second switching module receives the fourth signal transmitted by the radio frequency front-end module, and transmits the fourth signal to the antenna module.

With reference to the second aspect, in some implementations of the second aspect, the antenna module includes a first antenna, a second antenna, a third antenna, and a fourth antenna, the first antenna and the second antenna are a first group, the third antenna and the fourth antenna are a second group, and the first switching module selects an antenna in the first group or the second group to send out the third signal.

With reference to the second aspect, in some implementations of the second aspect, the second switching module selects the first antenna or the second antenna in the first group to send out the fourth signal, or the third antenna or the fourth antenna in the second group to send out the fourth signal.

With reference to the second aspect, in some implementations of the second aspect, the second switching module determines, based on strength of a signal received by the antenna module, an operating antenna in the first group or the second group, and the first switching module determines, based on the strength of the signal received by the antenna module, that the fourth signal is to be sent out by the antenna in the first group or the second group.

With reference to the second aspect, in some implementations of the second aspect, the first switching module includes at least one double-pole double-throw switch, and the second switching module includes at least one double-pole double-throw switch.

With reference to the second aspect, in some implementations of the second aspect, the plurality of radio frequency channels each include a power amplifier and a filter, to perform power amplification and filtering on the third signal.

With reference to the second aspect, in some implementations of the second aspect, the first switching module and the radio frequency processing module are integrated in a radio frequency chip.

DETAILED DESCRIPTION OF EMBODIMENTS

The following describes technical solutions of this application with reference to the accompanying drawings.

Figure 1:
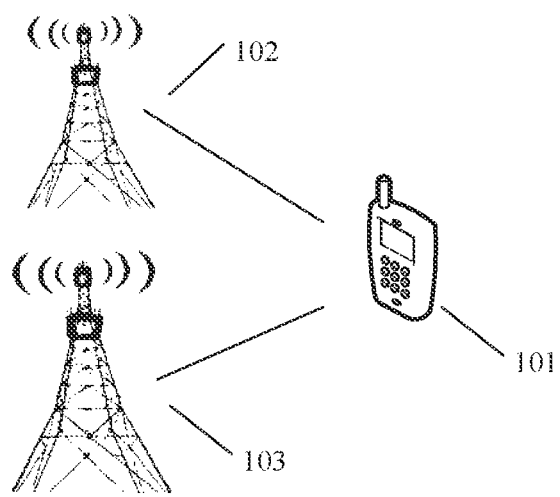
FIG. 1 is a schematic architectural diagram of a communications system applicable to embodiments of this application.

FIG. 1 is a schematic architectural diagram of a mobile communications system applicable to embodiments of this application.

As shown in FIG. 1, the mobile communications system may include an electronic device 101, a 4G base station 102, and a 5G base station 103.

The electronic device 101 may communicate with the 4G base station 102 and the 5G base station 103 simultaneously.

The electronic device 101 may be referred to as an access terminal, a subscriber unit, a subscriber station, a mobile station, a remote station, a remote terminal, a mobile device, a user terminal, a terminal, a wireless communications device, a user agent, a user apparatus, or the like. The electronic device may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, an electronic device in a 5G network, or an electronic device in a future evolved public land mobile network (Public Land Mobile Network, PLMN). This is not limited in the embodiments of this application.

Optionally, in an NSA case, the communications system may further include a core network. The core network may be a 4G core network or a 5G core network. The electronic device in a connected state may use radio resources of at least two different base stations (including a primary station and a secondary station) simultaneously. However, the 5G base station 103 cannot directly establish a connection to the core network, and the 5G base station 103 needs to be connected to the core network via the 4G base station 102. In this case, a user plane and a control plane of the 5G base station 103 may need to be connected by the 4G base station. In another case, a user plane of the 5G base station 103 may be connected to the core network, while a control plane of the 5G base station 103 is still connected to the 4G base station 102. In other words, the electronic device 101 needs to communicate with both the 4G base station 102 and the 5G base station 103 simultaneously to obtain information.

Optionally, in another NSA networking possibility, the core network may be a 5G core network, a user plane and a control plane of the 5G base station 103 are connected to the core network, a control plane of the 4G base station 102 may be connected to the 5G base station 103, and a user plane of the 4G base station 102 may be connected to the core network or the 5G base station.

For a sub-6 GHz frequency band (for example, 3.5 GHz or 5 GHz) in a 5G network, there is great spatial fading in a transmission process, and an electronic device is easily limited in uplink during use, especially in contact with a human's head and hands and in other scenarios involving a human body. However, switching a transmit antenna to an area that is not held by a human body can effectively improve performance of the electronic device, and is therefore an effective method for improving user experience.

In an NSA scenario, a 4G signal needs to occupy one transmit channel, and for an electronic device having only two transmit channels, only one transmit channel is left for a 5G signal. In this case, a design of a one transmit two receive (One Transmit Two Receive, 1T2R) antenna mode is commonly used. For a 5G frequency band, such a design can provide only switching between two antennas, and cannot meet an actual requirement.

In addition, when sending an SRS, the electronic device is required to be capable of switching a plurality of antennas to operate, to send the reference signal in turn. If the electronic device can provide only the T2R antenna mode, there are only two NR antennas for sending the SRS in turn, and a network device can receive related parameters of only the two NR antennas. For remaining NR antennas that do not send the SRS, only a blind reception manner can be used, causing great uncertainty.

Therefore, this application provides a software-hardware combined solution with better performance, to resolve a multi-antenna switching proble.

Figure 2:
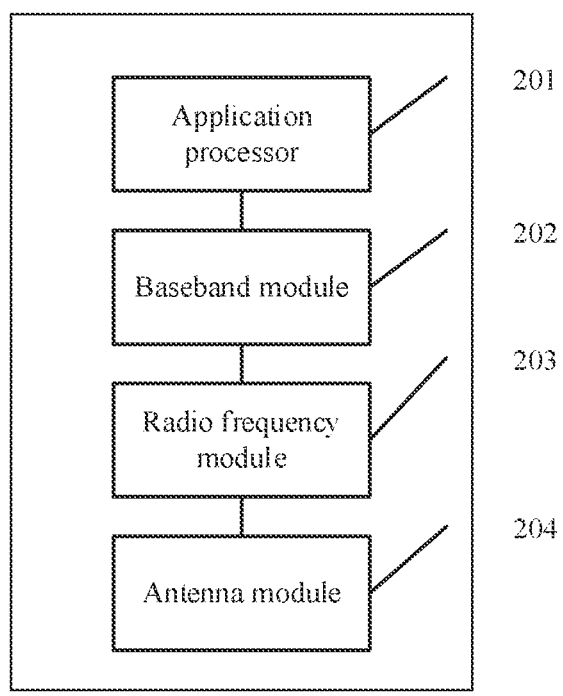
FIG. 2 is a schematic diagram of an electronic device according to an embodiment of this application.

FIG. 2 is a schematic structural diagram of an electronic device.

The electronic device may include an application processor (Application Processor. AP) 201, a baseband module 202, a radio frequency module 203, and an antenna module 204.

The application processor 201 generates a first signal that needs to be sent out. After being processed by the baseband module 202, the first signal becomes a recognizable second signal, where the second signal may be a digital signal. The second signal is processed by a digital-to-analog converter and a radio frequency processing module in the radio frequency module 204 to generate a third signal. After the radio frequency module 204 performs processing such as filtering and amplification on the third signal, a fourth signal is generated, and may be sent out by the antenna module 204.

It should be understood that the radio frequency module 204 may include a plurality of radio frequency channels, each radio frequency channel may include a plurality of radio frequency components to process a radio frequency signal, and each radio frequency channel may be electrically connected to the antenna module to transmit the radio frequency signal to the antenna module.

Optionally, when switching an antenna to send a signal, the electronic device may switch the radio frequency channels in the radio frequency module 204, so as to switch the antenna.

It should be understood that, the antenna module 204 may include a plurality of antennas that can send out signals, so that a requirement of switching a plurality of antennas on a 5G frequency band can be met.

Figure 3:
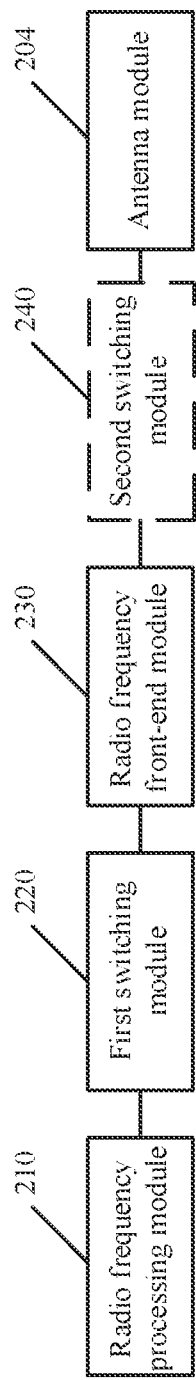
FIG. 3 is a schematic structural diagram of an antenna switching circuit according to an embodiment of this application.

FIG. 3 is a structural diagram of an antenna switching circuit according to an embodiment of this application.

The antenna switching circuit is a part of a radio frequency module and an antenna module in an electronic device, and is configured to control selection of a radio frequency channel and switching of an antenna.

The antenna switching circuit may include a radio frequency processing module 210, a first switching module 220, a radio frequency front-end module 230, and an antenna module 204 that are electrically connected in sequence.

The radio frequency processing module 210, the first switching module 220, and the radio frequency front-end module 230 are a part of the radio frequency module 203.

It should be understood that the radio frequency channel may be a circuit in the radio frequency front-end module 230 for transmitting a radio frequency signal. The radio frequency channel may include an amplifier, a filter, a switch, and the like, to perform related processing on a radio frequency signal. A transmit channel may be a circuit that is in the radio frequency processing module 210 and that is electrically connected to an external circuit to receive a first radio frequency signal. The transmit channel may include a phase-locked loop (Phase-Locked Loop, PLL) to ensure relative stability of a phase of an input radio frequency signal, and may further include another component for processing a radio frequency signal. A radio frequency transmit channel may be a circuit that is in the radio frequency processing module 210 and that is electrically connected to the first switching module 220, and may be configured to select a circuit in the first switching module 220.

Optionally, the radio frequency module may further include a digital-to-analog converter, which can convert a digital signal transmitted by a baseband module into a radio frequency signal, and then send a first radio frequency signal to the radio frequency processing module 210 for processing. The processing may include modulating the radio frequency signal with a carrier by using a multiplier, performing power amplification on the radio frequency signal by using an amplifier, filtering out clutter the radio frequency signal by using a filter, and the like. A second radio frequency signal may be generated after the processing. The radio frequency processing module 210 may include a plurality of transmit channels electrically connected to a digital-to-analog conversion module and a plurality of radio frequency channels electrically connected to the first switching module.

Optionally, the first switching module 220 may be configured to select, from a plurality of radio frequency channels in the radio frequency front-end module, a radio frequency channel electrically connected to the radio frequency processing module 210. A loss value generated when the second radio frequency signal passes through the first switching module 220 may be obtained in a test or in another manner.

Optionally, the radio frequency front-end module 230 may perform processing such as power amplification and filtering on the first radio frequency signal to generate a second radio frequency signal.

Optionally, the first switching module 220 may include one or more switches, and the switch may be double-pole double-throw, double-pole four-throw, or in another manner. One end of each of the plurality of switches may be correspondingly connected to each of a plurality of radio frequency transmit channels in the radio frequency processing module 210, and the other end is correspondingly connected to each of the plurality of radio frequency channels in the radio frequency front-end module 230. The radio frequency channel in the radio frequency processing module 210 may select the radio frequency channel in the radio frequency front-end module 230 by using the first switching module 220, to switch a transmit antenna.

Optionally, when performing amplification on the first radio frequency signal, the radio frequency processing module 210 may take into account a loss value generated when the radio frequency signal passes through the first switching module 220, to increase power of the transmitted radio frequency signal, so that power of the first radio frequency signal when reaching the radio frequency front-end module 230 is the same as power with no addition of the first switching module 220.

A loss value of the first switching module 220 may be taken into account during design, and an amplification multiple of an amplifier in the radio frequency processing module 210 may be increased to make power of the second radio frequency signal when reaching the radio frequency front-end module 230 the same as power with no addition of the first switching module 220. Alternatively, a feedback system may be added to the radio frequency front-end module 230, and a software-hardware combined manner is used to make power of the second radio frequency signal when reaching the radio frequency front-end module 230 the same as power with no addition of the first switching module 220.

Optionally, the antenna switching circuit may further include a second switching module 240, and the second switching module may be located between the radio frequency front-end module 230 and the antenna module 204. One end of the second switching module 240 may be electrically connected to a corresponding radio frequency channel in the radio frequency front-end module, and the other end may be electrically connected to a corresponding circuit in the antenna module 204. The second switching module 240 may include one or more switches, and the switch may be double-pole double-throw, double-pole four-throw, or in another manner.

It should be understood that, after the antenna switching circuit includes the second switching module 240, the antenna switching circuit changes from single-stage switching to two-stage switching, and this can increase combinations of radio frequency channels in a process of transmitting the radio frequency signal from the radio frequency processing module 210 to the antenna processing module 204.

For example, if both the first switching module 220 and the second switching module 240 may include a plurality of double-pole double-throw switches, when one transmit channel that is in the radio frequency processing module 210 and that receives the first radio frequency signal from the external circuit sends the second radio frequency signal, the first switching module 220 may select two different radio frequency channels in the radio frequency front-end module 230 to generate a third radio frequency signal. When the third radio frequency signal passes through the second switching module, the radio frequency channels may select two different antennas in the antenna module 204 to send out the third radio frequency signal. In the two-stage switching manner, the antenna switching circuit switches a plurality of transmit antennas.

It should be understood that, the antenna switching circuit in this application may be applied to a 5G system, or may be applied to a Global System for Mobile Communications (Global System for Mobile communications. GSM) system, a Code Division Multiple Access (Code Division Multiple Access. CDMA) system, a Wideband Code Division Multiple Access (Wideband Code Division Multiple Access, WCDMA) system, a general packet radio service (General Packet Radio Service, GPRS), an LTE system, an LTE frequency division duplex (Frequency Division Duplex, FDD) system, an LTE time division duplex (Time Division Duplex, TDD), Universal Mobile Telecommunications System (Universal Mobile Telecommunications System, UMTS), and a Worldwide Interoperability for Microwave Access (Worldwide interoperability for Microwave Access, WiMAX) communications system.

Figure 4:
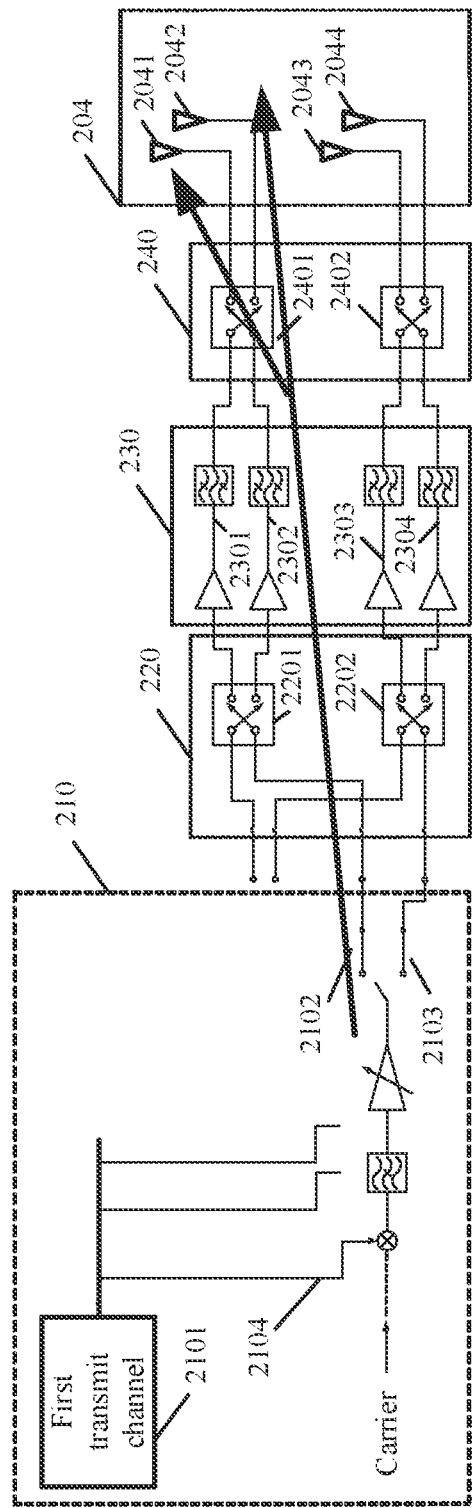
FIG. 4 is a schematic diagram of an antenna switching circuit according to an embodiment of this application.

FIG. 4 is a schematic diagram of an antenna switching circuit according to this application.

As shown in FIG. 4, considering design difficulty of a printed circuit board (Printed Circuit Board, PCB), the first switching module 220 may include a plurality of double-pole double-throw switches, which may be replaced by switches in another form based on a design requirement.

It should be understood that, in this embodiment of this application, quantities of components such as transmit channels, radio frequency channels, switches, and antennas are merely used as examples, and these quantities are not limited in this application.

The radio frequency processing module 210 may include a plurality of transmit channels and a plurality of radio frequency transmit channels connected to the transmit channels. In this embodiment, one transmit channel that receives a first radio frequency signal from an external circuit is merely used for description. The radio frequency processing module 210 may include a first transmit channel 2101, and a first radio frequency transmit channel 2102 and a second radio frequency transmit channel 2103 that are electrically connected to the first transmit channel 2101. The first transmit channel 2101 may be electrically connected to a circuit inside an electronic device, and the circuit inside the electronic device provides a first radio frequency signal for the first transmit channel 2101. For example, the first transmit channel 2101 may be electrically connected to a digital-to-analog converter in a radio frequency module inside the electronic device. The first transmit channel 2101 may include a PLL to ensure relative stability of a phase of an input first radio frequency signal, and may further include another component for processing the first radio frequency signal.

The first transmit channel 2101 is a circuit in the radio frequency processing module that receives the first radio frequency signal, and the first radio frequency transmit channel 2102 and the second radio frequency transmit channel 2103 are circuits in the radio frequency processing module that are electrically connected to the first switching module. The first transmit channel 2101 may be electrically connected to the first radio frequency transmit channel 2102 and the second radio frequency transmit channel 2103 via a first channel 2104 in the radio frequency processing module. The first switching module 220 may include two double-pole double-throw switches, which are a first switch 2201 and a second switch 2202, respectively. One end of the switch in the first switching module 220 may be electrically connected to a corresponding channel in the radio frequency processing module 210, and the other end of the switch may be electrically connected to a radio frequency channel in the radio frequency front-end module 230, to implement switching of a radio frequency circuit.

It should be understood that the radio frequency processing module may have a plurality of radio frequency transmit channels electrically connected to the switches in the first switching module. In this embodiment, two radio frequency transmit channels are used merely for description. The first radio frequency transmit channel 2101 may be electrically connected to the first switch 2201 in the first switching module 220, the second radio frequency transmit channel 2103 may be electrically connected to the second switch 2202 in the first switching module 220, and other inputs in the first switching module may be electrically connected to other radio frequency channels in the radio frequency processing module. Details are not described one by one in this application.

The radio frequency front-end module 230 may perform power amplification and filtering on the second radio frequency signal received from the first switching module 220, to generate a third radio frequency signal. The radio frequency front-end module 230 may include a power amplifier (Power Amplifier, PA) and a filter. In this embodiment, a first radio frequency channel 2301 and a second radio frequency channel 2302 include a first PA, and a third radio frequency channel 2303 and a fourth radio frequency channel 2304 include a second PA.

The antenna module 204 may include a first antenna 2041, a second antenna 2042, a third antenna 2043, and a fourth antenna 2044.

Optionally, the first transmit channel 2101 in the radio frequency processing module 210 sends a first radio frequency signal. The first radio frequency signal may be modulated with a carrier by using a multiplier, power amplification may be performed on the radio frequency signal by using an amplifier, and clutter may be filtered out from the radio frequency signal by using a filter, to generate a second radio frequency signal. The first radio frequency transmit channel 2102 or the second radio frequency transmit channel 2103 is selected to transmit the second radio frequency signal to the first switching module. When the radio frequency processing module 210 amplifies the first radio frequency signal, a loss value of the first switching module 220 may be included. For the second radio frequency signal, a channel electrically connected to the first switching module 220 may be selected by using a switch, and the second radio frequency signal is electrically connected to the radio frequency channel in the radio frequency front-end module 230 by using the first switch 2201 or the second switch 2202 in the first switching module 220. The radio frequency front-end module 230 may perform further power amplification and filtering on the second radio frequency signal, to generate a third radio frequency signal. Then, the radio frequency front-end module 230 may be electrically connected to the antenna module 204, and the antenna module 204 sends out the third radio frequency signal.

Optionally, the radio frequency processing module 210 may include the loss value of the first switching module 220 in the channel in transmit power of the second radio frequency signal. When the second radio frequency signal reaches the radio frequency front-end module, power of the second radio frequency signal is the same as power of the second radio frequency signal when not passing through the first switching module, so that a power loss of the second radio frequency signal can be effectively avoided.

Optionally, the antenna switching circuit may include a second switching module 240, and the second switching module 240 may include two double-pole double-throw switches, which are a third switch 2401 and a fourth switch 2402, respectively. One end of the switch in the second switching module 240 may be electrically connected to a corresponding channel in the radio frequency front-end module 230, and the other end of the switch is electrically connected to a channel in the antenna module 204, to implement antenna switching.

It should be understood that the first antenna 2041 and the second antenna 2042 may be grouped into a first group, and the third antenna 2043 and the fourth antenna 2044 may be grouped into a second group. As shown in FIG. 4, a switch in the second switching module may be used to select an antenna in an antenna group corresponding to the switch, to send out the third radio frequency signal, and the first switching module may be used to select the first group or the second group, to send out the third radio frequency signal.

The first transmit channel 2101 in the radio frequency processing module 210 sends a first radio frequency signal. The first radio frequency signal may be modulated with a carrier by using a multiplier, and then clutter is filtered out by using a filter, and then power amplification is performed on the radio frequency signal by using an amplifier, to generate a second radio frequency signal, where a loss value of the second radio frequency signal when passing through the first switching module 220 is already included. For the second radio frequency signal, the first radio frequency transmit channel 2102 or the second radio frequency transmit channel 2103 is selected to be electrically connected to the first switching module 220. The second radio frequency signal is electrically connected to a radio frequency channel in the radio frequency front-end module 230 by using the first switch 2201 or the second switch 2202 in the first switching module 220. The radio frequency front-end module 230 may perform processing such as power amplification and filtering on the second radio frequency signal to generate a third radio frequency signal. The radio frequency channel in the radio frequency front-end module 230 may be electrically connected to the third switch 2401 and the fourth switch 2402 in the second switching module 240, and the second switching module 240 selects a transmit antenna in the antenna module 204 to send out the third radio frequency signal.

In this manner, two-stage switching by the antenna switching circuit can be implemented, and a larger degree of freedom of antenna switching can be obtained without a noticeable performance loss.

Optionally, when the first switch 2201, the second switch 2202, the third switch 2401, and the fourth switch 2402 each may use a double-pole double-throw switch, the antenna switching circuit can enable the radio frequency transmit channel of the radio frequency processing module 210 to select two channels from four radio frequency channels each time. For example, after the radio frequency processing module is electrically connected to the first switching module, the radio frequency channel in the radio frequency front-end module may be selected by using the switch in the first switching module, to implement switching of two radio frequency channels. After the radio frequency front-end module is electrically connected to the second switching module, the antenna in the antenna module may be selected by using the switch in the second switching module to send out a signal, to implement switching of two antennas for one radio frequency channel in the radio frequency front-end module. The first switching module and the second switching module can implement free switching of the radio frequency signal in the radio frequency processing module among the first antenna 2041, the second antenna 2042, the third antenna 2043, and the fourth antenna 2044.

For an SRS, by using two-stage switching, the SRS can be sent in turn on a plurality of antennas. When the first transmit channel 2101 in the radio frequency processing module 210 sends the SRS, the SRS may be sent in turn by using the following switching procedure:

(1) As shown by an arrow direction in FIG. 4, the first transmit channel 2101 may select the first radio frequency transmit channel 2102 to be electrically connected to the first switching module, and the first switch 2201 in the first switching module 220 chooses to be electrically connected to the first radio frequency channel 2301 or the second radio frequency channel 2302 in the first PA in the radio frequency front-end module 230. Through the third switch 2401 in the second switching module 240, the first antenna 2041 and the second antenna 2042 can send the SRS in turn.

(2) The second PA is enabled before the first antenna 2041 and the second antenna 2042 complete sending of the SRS, and after the first antenna 2041 and the second antenna 2042 complete sending, the radio frequency signal is switched from the first radio frequency transmit channel 2102 to the second radio frequency transmit channel 2103 to be electrically connected to the second switch 2202 in the first switching module 220. The second switch 2202 chooses to be electrically connected to the third radio frequency channel 2303 or the fourth radio frequency channel 2304 in the second PA in the radio frequency front-end module 230. Through the fourth switch 2402 in the second switching module 240, the third antenna 2043 and the fourth antenna 2045 send the SRS in turn.

(3) The antenna switching circuit is restored to an operating state before sending of the SRS is started.

It should be understood that the radio frequency processing module 210 and the first switching module 220 may be integrated in a radio frequency chip, and the radio frequency processing module 210 and the first switching module 220 may be integrated in the same chip or different chips.

It should be understood that the radio frequency front-end module 230 and the first switching module 220 may be integrated in a radio frequency chip, and the radio frequency front-end module 230 and the first switching module 220 may be integrated in the same chip or different chips.

Figure 5:
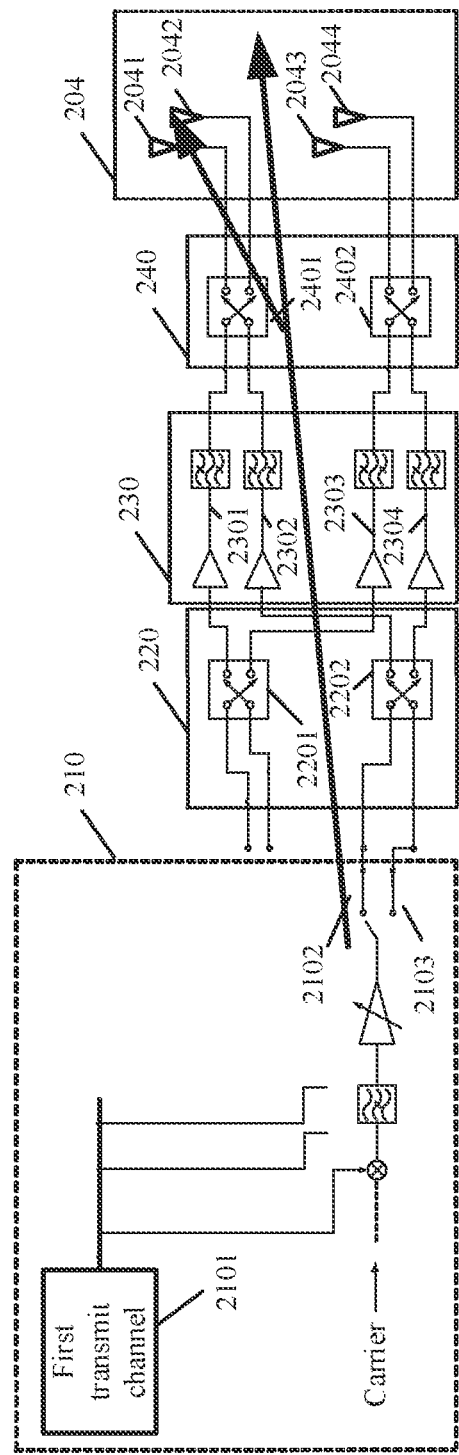
FIG. 5 is a schematic diagram of another antenna switching circuit according to an embodiment of this application.

FIG. 5 is a schematic diagram of another antenna switching circuit.

Compared with FIG. 4, a manner of electrical connection between the first switching circuit 220 and the radio frequency processing module 210 as well as the radio frequency front-end module 230 in FIG. 5 changes.

As shown in FIG. 5, the first switching module 220 and the second switching module 240 each may include a plurality of double-pole double-throw switches.

It should be understood that, in this embodiment, quantities of components such as transmit channels, radio frequency channels, switches, and antennas are merely used as examples, and these quantities are not limited in this application.

It should be understood that the first antenna 2041 and the second antenna 2042 may be grouped into a first group, and the third antenna 2043 and the fourth antenna 2044 may be grouped into a second group. As shown in FIG. 4, a switch in the second switching module may be used to select an antenna in an antenna group corresponding to the switch, to send out a signal, and the first switching module may be used to select the first group or the second group, to send out the signal.

The first radio frequency transmit channel 2102 and the second radio frequency transmit channel 2103 in the radio frequency processing module 210 may choose to be electrically connected to a circuit corresponding to the second switch 2202 in the first switching module 220. The second switch 2202 may choose to be electrically connected to the radio frequency channel that is in the radio frequency front-end module 230 and that includes the first PA or the second PA, and the radio frequency channel in the radio frequency front-end module 230 may be electrically connected to the third switch 2401 and the fourth switch 2402 in the second switching module 240. The second switching module 240 selects the antenna in the antenna module 204 to send out the signal.

Optionally, the radio frequency processing module 210 may modulate the first radio frequency signal with a carrier by using a multiplier, filter out clutter by using a filter, and perform power amplification on the radio frequency signal by using an amplifier, to generate a second radio frequency signal, where a loss value of the second radio frequency signal when passing through the first switching module 220 is already included. When the second radio frequency signal reaches the radio frequency front-end module 230, power of the second radio frequency signal is the same as power of the second radio frequency signal when not passing through the first switching module, so that a power loss of the radio frequency signal can be effectively avoided.

In this manner, two-stage switching by the antenna switching circuit can be implemented, and a larger degree of freedom of antenna switching can be obtained without a noticeable performance loss.

Optionally, when the first switch 2201, the second switch 2202, the third switch 2401, and the fourth switch 2402 each may use a double-pole double-throw switch, the antenna switching circuit can enable the radio frequency transmit channel of the radio frequency processing module 210 to select two channels from four radio frequency channels each time. For example, after the radio frequency processing module is electrically connected to the first switching module, the radio frequency channel in the radio frequency front-end module may be selected by using the switch in the first switching module, to implement switching of two radio frequency channels. After the radio frequency front-end module is electrically connected to the second switching module, the antenna in the antenna module may be selected by using the switch in the second switching module to send out a signal, to implement switching of two antennas for one radio frequency channel in the radio frequency front-end module. The first switching module and the second switching module can implement free switching of the radio frequency signal in the radio frequency processing module among the first antenna 2041, the second antenna 2042, the third antenna 2043, and the fourth antenna 2044.

For the SRS, by using two-stage switching, 1T4R can be implemented. When the first transmit channel in the radio frequency processing module sends the SRS, the SRS may be sent in turn by using the following switching procedure:

(1) As shown by an arrow direction in FIG. 5, the first transmit channel 2101 may be electrically connected to the second switch 2202 in the first switching module 210, and the second switch 2202 chooses to be electrically connected to the second radio frequency channel 2302 in the first PA in the radio frequency front-end module 230. Through the third switch 2401 in the second switching module, the first antenna 2041 and the second antenna 2042 send the SRS in turn.

(2) The second PA is enabled before the first antenna 2041 and the second antenna 2042 complete sending of the SRS, and after the first antenna 2041 and the second antenna 2042 complete sending, the second switch 2202 is switched to select the fourth radio frequency channel 2304 in the second PA in the radio frequency front-end module 230. Through the fourth switch 2402 in the second switching module 240, the third antenna 2043 and the fourth antenna 2045 send the SRS in turn.

(3) The antenna switching circuit is restored to an operating state before sending of the SRS is started.

It should be understood that the radio frequency processing module 210 and the first switching module 220 may be integrated in a radio frequency chip, and the radio frequency processing module 210 and the first switching module 220 may be integrated in the same chip or different chips.

It should be understood that the radio frequency front-end module 230 and the first switching module 220 may be integrated in a radio frequency chip, and the radio frequency front-end module 230 and the first switching module 220 may be integrated in the same chip or different chips.

Figure 6:
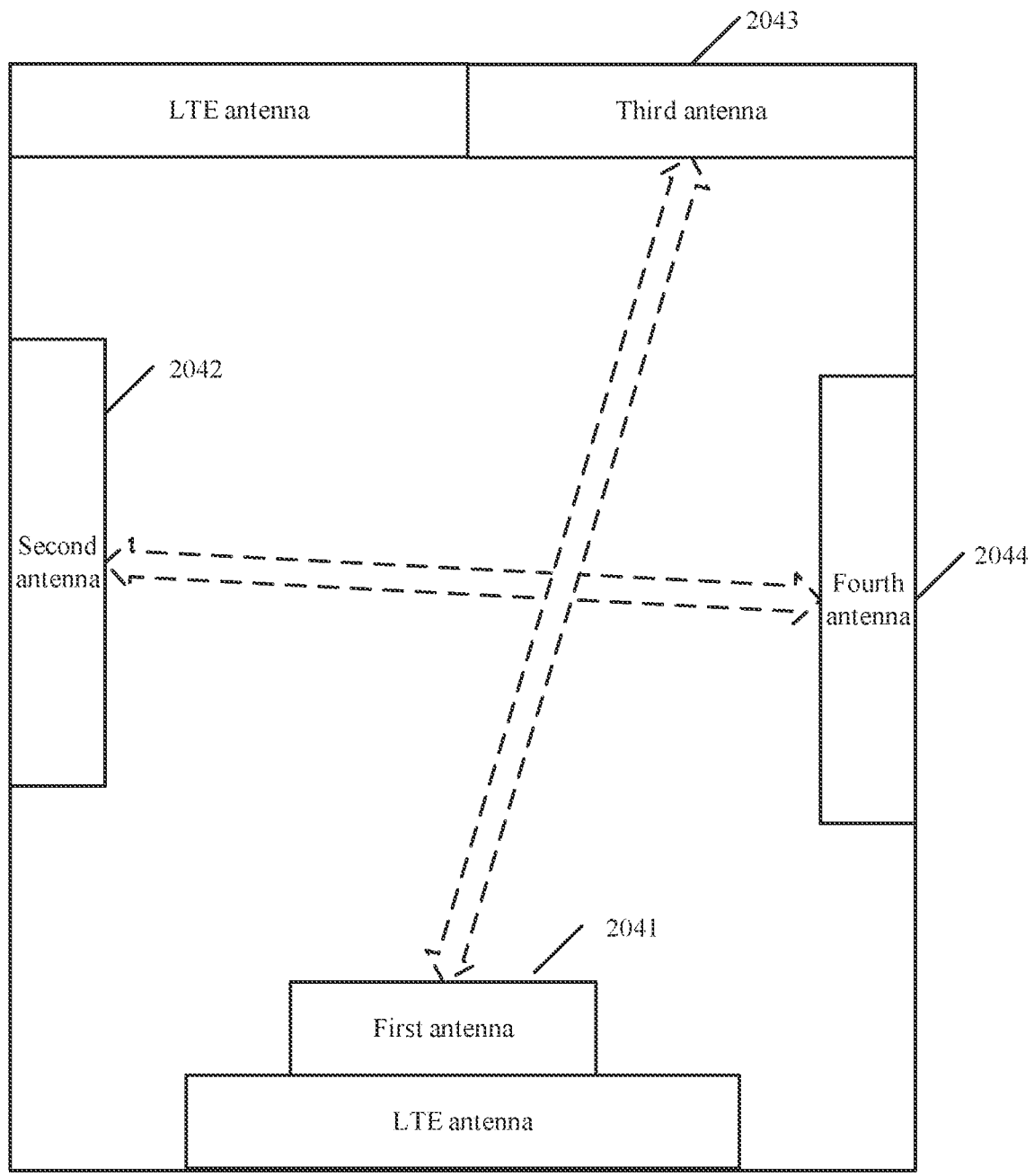
FIG. 6 is a schematic diagram of antenna distribution of an electronic device according to an embodiment of this application.

FIG. 6 is a schematic diagram of antenna distribution in an electronic device.

In an NSA scenario, in this antenna distribution manner, it can be ensured that when a radio frequency processing module of the electronic device has only one transmit channel for a 5G signal, the 5G signal may be sent out on any NR antenna on the electronic device.

An LTE antenna may send and receive 4G frequency band signals. A first antenna 2041, a second antenna 2042, a third antenna 2043, and a fourth antenna 2044 are all NR antennas, and may receive and send 5G frequency band signals.

It should be understood that the first antenna 2041, the second antenna 2042, the third antenna 2043, and the fourth antenna 2044 may be distributed at different positions of the electronic device, so that even when the electronic device is in contact with a human's head and hands and in other scenarios involving a human body, some NR antennas may not be affected.

Because a frequency of a signal used in a 5G network is relatively high, there is great spatial fading in a transmission process, and an electronic device is easily limited in uplink during use, especially in contact with a human's head and hands and in other scenarios involving a human body. However, switching a transmit antenna to an area that is not held by a human body can effectively improve performance of the electronic device, and is therefore an effective method for improving user experience.

For an SRS, the SRS may be sent out on any one of the four NR antennas, so that a network device can determine states of the four NR antennas on the electronic device, thereby facilitating information sending accuracy.

It should be understood that antenna switching may be implemented in plurality of manners. For this embodiment, the first antenna 2041 and the second antenna 2042 may be used as a first group, and the third antenna 2043 and the fourth antenna 2044 may be used as a second group. First, comparison is separately performed within the first group and the second group. An antenna in a better operating state in each group may be determined based on strength of a signal received by the antenna, and a second switching module may select the antenna in the better operating state in each group to send out a radio frequency signal. Then, an antenna in an optimal operating state is determined based on strength of signals received by optimal antennas in the groups, and a first switching module may select the antenna in the optimal operating state to send out the radio frequency signal.

Optionally, for some extreme cases, comparison may alternatively be directly performed for antenna switching. For example, when strength of a signal received by the first antenna 2041 is less than a first threshold, it is determined that the first antenna 2041 may be in a scenario involving a human's head and hands. The first switching module and/or the second switching module may directly switch to the third antenna 2043 or another NR antenna.

For antenna switching, the working procedure may be as follows: (1) By separate comparison within the group, an antenna in a better operating state in the group is determined, for example, by using a received signal strength indication (Received Signal Strength Indication, RSSI) of an antenna module, and the second switching module may select the antenna to operate.

(2) Based on the method in step (1), antennas in a better operating state in the first group and the second group may be selected, an antenna in a better operating state may be selected by comparing received signal strength of the antennas selected from the first group and the second group, and the first switching module may select the antenna to operate.

Figure 7:
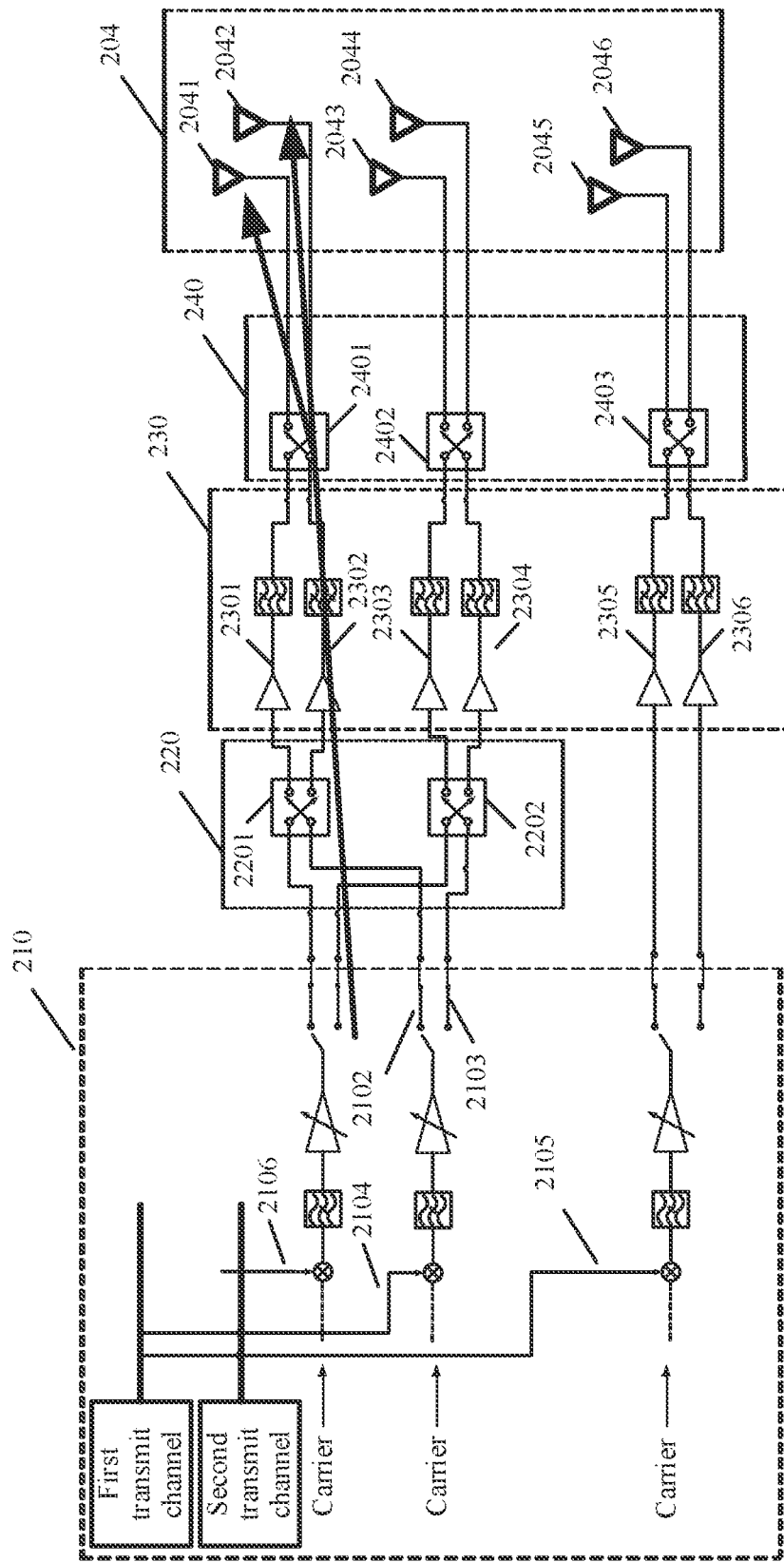
FIG. 7 is a schematic diagram of an antenna switching circuit according to an embodiment of this application.

FIG. 7 is a schematic structural diagram of an antenna switching circuit in NSA.

The antenna switching circuit may include a radio frequency processing module 210, a first switching module 220, a radio frequency front-end module 230, a second switching module 240, and an antenna module 204.

The radio frequency processing module 210 may include two radio frequency transmit channels, which are a first transmit channel and a second transmit channel, respectively, electrically connected to an external circuit, and may include a plurality of channels electrically connected to the first transmit channel and the second transmit channel, for example, a first channel 2104 and a second channel 2105 that are electrically connected to the first transmit channel. The first transmit channel may be electrically connected to a first radio frequency transmit channel 2102 or a second radio frequency transmit channel 2103 by using the first channel 2104, and the first radio frequency transmit channel 2102 or the second radio frequency transmit channel 2103 may be electrically connected to the first switching module. A plurality of channels may be further electrically connected to the first switching module based on a design requirement.

It should be understood that, in an NSA scenario, the electronic device needs to establish a connection to a 4G base station and a 5G base station simultaneously, to perform signal transmission. Therefore, in the NSA scenario, the first transmit channel may operate on a 4G frequency band, and the second transmit channel may operate on a 5G frequency band.

Optionally, when the electronic device operates in the NSA scenario, the first transmit channel operates on a 4G frequency band, and the second transmit channel operates on a 5G frequency band.

For the 4G frequency band, the first transmit channel in the radio frequency processing module 210 sends a radio frequency signal. After passing through the second channel 2105, the radio frequency signal may be modulated with a carrier by using a multiplier, clutter is filtered out by using a filter, and power amplification is performed on the radio frequency signal by using an amplifier. Then, the radio frequency signal is electrically connected to a fifth radio frequency channel 2305 or a sixth radio frequency channel 2306 in the radio frequency front-end module. The fifth radio frequency channel 2305 or the sixth radio frequency channel 2306 may include a power amplifier and a filter. The fifth radio frequency channel 2305 or the sixth radio frequency channel 2306 may perform power amplification and filtering on the radio frequency signal, and the fifth radio frequency channel 2305 or the sixth radio frequency channel 2306 is electrically connected to a fifth switch 2403 in the second switching module 240. A fifth antenna 2045 or a sixth antenna 2046 in the antenna module 204 is selected by using the fifth switch, to send out the radio frequency signal.

For the 5G frequency band, the second transmit channel in the radio frequency processing module 210 sends a first radio frequency signal. After passing through the third channel 2106, the radio frequency signal may be modulated with a carrier by using a multiplier, clutter is filtered out by a filter, and power amplification is performed on the radio frequency signal by using an amplifier, to generate a second radio frequency signal, where a loss value of the second radio frequency signal when passing through the first switching module 220 is already included. The radio frequency processing module 210 may be electrically connected to the first switching module, and the second radio frequency signal is electrically connected to a radio frequency channel in the radio frequency front-end module 230 by using a first switch 2201 or a second switch 2202 in the first switching module 220. The radio frequency front-end module 230 may include a power amplifier and a filter, and may perform processing such as power amplification and filtering on the second radio frequency signal, to generate a third radio frequency signal. The radio frequency channel in the radio frequency front-end module 230 may be electrically connected to a third switch 2401 and a fourth switch 2402 in the second switching module 240. The second switching module 240 selects an antenna in the antenna module 204, to send out the third radio frequency signal.

In an NSA scenario, an SRS needs to be sent in turn on NR antennas. When two-stage switching is used, 1T4R can be implemented. When the second transmit channel in the radio frequency processing module sends the SRS, the SRS may be sent in turn by using the following switching procedure:

(1) As shown by an arrow direction in FIG. 7, the second transmit channel may be electrically connected to the first switch 2201 in the first switching module 210, and the first switch 2201 chooses to be electrically connected to a first radio frequency channel 2301 or a second radio frequency channel 2302 in a first PA in the radio frequency front-end module 230. Through third switch 2401 in the second switching module, the first antenna 2041 and the second antenna 2042 send the SRS m turn.

(2) A second PA is enabled before the first antenna 2041 and the second antenna 2042 complete sending of the SRS, and after the first antenna 2041 and the second antenna 2042 complete sending, the second transmit channel is switched to be electrically connected to the second switch 2202 in the first switching module 210. The second switch 2202 chooses to be electrically connected to a third radio frequency channel 2303 or a fourth radio frequency channel 2304 in the second PA in the radio frequency front-end module 230. Through the fourth switch 2402 in the second switching module 240, the third antenna 2043 and the fourth antenna 2045 send the SRS in turn.

(3) The antenna switching circuit is restored to an operating state before sending of the SRS is started.

Based on the technical solutions provided in this embodiment, when the electronic device operates in an NSA scenario, multi-channel switching of an antenna on a 5G frequency band can be implemented, and a radio frequency channel and the antenna can be freely switched in a scenario involving a human's head and hands, and in other scenarios involving a human body, thereby improving user experience. In addition, the NR antennas can send an SRS in turn, and performance of the electronic device is enhanced.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna switching circuit, comprising:
a radio frequency processor configured to:
receive a first radio frequency signal from an external circuit;
process the first radio frequency signal based on a loss value of a first switch to generate a second radio frequency signal; and
transmit the second radio frequency signal;
a first switch configured to:
receive the second radio frequency signal;
select, from a plurality of radio frequency channels in the radio frequency processor, a radio frequency channel coupled to the radio frequency processor; and
transmit the second radio frequency signal using one of the plurality of radio frequency channels;
a radio frequency front-end configured to:
receive the second radio frequency signal;
process the second radio frequency signal to generate a third radio frequency signal; and
transmit the third radio frequency signal; and
an antenna system comprising;
a plurality of antennas; and
a second switch configured to select a first antenna among the plurality of antennas in the antenna system and that is coupled to a plurality of radio frequency channels in the radio frequency front-end, and wherein the second switch is configured to:
receive the third radio frequency signal; and
transmit the third radio frequency signal to the antenna system, wherein the first antenna is configured to output the third radio frequency signal.

2. The antenna switching circuit of claim 1, wherein the radio frequency processor comprises a first transmit channel and a second transmit channel, and wherein at least one of the first transmit channel or the second transmit channel is configured to operate in a 5G frequency band.

3. The antenna switching circuit of claim 1, wherein the antenna system comprises a first antenna, a second antenna, a third antenna, and a fourth antenna, wherein the first antenna and the second antenna are a first group, wherein the third antenna and the fourth antenna are a second group, and wherein the first switch is configured to select an antenna from among the first group or the second group to output the third radio frequency signal.

4. The antenna switching circuit of claim 3, wherein the second switch is configured to select an antenna from among the first group the second group to output the third radio frequency signal.

5. The antenna switching circuit of claim 4, wherein the second switch is configured to select, based on strength of a signal received by the antenna system, an operating antenna in the first group or the second group, and wherein the first switch is configured to select, based on the strength of the signal received by the antenna system, that the third radio frequency signal is to be output by the selected antenna in the first group or the second group.

6. The antenna switching circuit of claim 1, wherein the first switch comprises a double-pole double-throw switch, and wherein the second switch comprises a double-pole double-throw switch.

7. The antenna switching circuit of claim 1, wherein the plurality of radio frequency channels each comprise a power amplifier and a filter configured to perform power amplification and filtering of the second radio frequency signal.

8. The antenna switching circuit of claim 1, wherein the first switch and the radio frequency processor are integrated in a radio frequency chip.

9. An electronic device, comprising:
an application processor configured to generate and transmit a first signal;
a baseband system configured to receive and process the first signal to generate and transmit a second signal;
a radio frequency processor configured to receive the second signal, processes the second signal based on a loss value of a first switch to generate and transmit a third signal;
a first switch configured to select, from a plurality of radio frequency channels in the radio frequency processor, a radio frequency channel coupled to the radio frequency processor, and transmit the third signal to one of the plurality of radio frequency channels;
a radio frequency front-end configured to receive the third signal transmitted by the first switch, process the third signal to generate a fourth signal, and transmit the fourth signal;
an antenna system comprising a plurality of antennas; and
a second switch configured to select an antenna of the antenna system, and that is coupled to a plurality of radio frequency channels in the radio frequency front-end, wherein the second switch receives the fourth signal and transmits the fourth signal to the antenna system, wherein the antenna system is configured to receive the fourth signal and output the fourth signal.

10. The electronic device of claim 9, wherein the radio frequency processor comprises a first transmit channel and a second transmit channel, and wherein at least one of the first transmit channel and the second transmit channel operates in a 5G frequency band.

11. The electronic device of claim 10, wherein the antenna system comprises a first antenna, a second antenna, a third antenna, and a fourth antenna, wherein the first antenna and the second antenna are a first group, wherein the third antenna and the fourth antenna are a second group, and wherein the first switch is configured to select an antenna from among the first group or the second group to output the third signal.

12. The electronic device of claim 11, wherein the second switch is configured to select from among the first group or the second group to output the fourth signal.

13. The electronic device of claim 12, wherein the second switch is configured to select, based on strength of a signal received by the antenna system, an operating antenna in the first group or the second group, and wherein the first switch is configured to select, based on the strength of the signal received by the antenna system, that the fourth signal is to be output by the selected antenna in the first group or the second group.

14. The electronic device of claim 10, wherein the first switch comprises a double-pole double-throw switch, and wherein the second switch comprises a double-pole double-throw switch.

15. The electronic device of claim 9, wherein the plurality of radio frequency channels each comprise a power amplifier and a filter configured to perform power amplification and filtering on the third signal.

16. The electronic device of claim 9, wherein the first switch and the radio frequency processor are integrated in a radio frequency chip.

17. An antenna switching method comprising:
receiving, by a radio frequency processor, a first radio frequency signal from an external circuit;
processing the first radio frequency signal based on a loss value of a first switch to generate a second radio frequency signal;
transmitting the second radio frequency signal to the first switch;
selecting, by the first switch, from a plurality of radio frequency channels in the radio frequency processor, a radio frequency channel coupled to the radio frequency processor, and transmitting the second radio frequency signal to one of the plurality of radio frequency channels;
receiving, by a radio frequency front-end, the second radio frequency signal, processing the second radio frequency signal to generate a third radio frequency signal, and transmitting the third radio frequency signal to an antenna system;
selecting, by a second switch coupled to the plurality of radio frequency channels, a first antenna from among a plurality of antennas in the antenna system; and
receiving, by the first antenna, the third radio frequency signal, and outputting the third radio frequency signal.

18. The switching method of claim 17, wherein the radio frequency processor receives a signal comprising a 5G frequency band.

19. The switching method of claim 17, wherein the antenna system comprises a first antenna, a second antenna, a third antenna, and a fourth antenna, wherein the first antenna and the second antenna are a first group, wherein the third antenna and the fourth antenna are a second group, and wherein the method comprises selecting, by the first switch, an antenna from among the first group or the second group to output the third radio frequency signal.

20. The switching method of claim 19, wherein the method comprises the selecting, by the second switch, an antenna from among the first group the second group to output the third radio frequency signal.

* * * * *